(12) United States Patent
Jones et al.

(10) Patent No.: US 7,692,672 B2
(45) Date of Patent: Apr. 6, 2010

(54) LIQUID CRYSTAL DEVICES WITH GREYSCALE

(75) Inventors: John C. Jones, Leigh Sinton (GB); Stephen M. Beldon, Ledbury (GB)

(73) Assignee: ZBD Displays Limited, Malvern, Worcs. (GB)

( * ) Notice: Subject to any disclaimer, the term of this patent is extended or adjusted under 35 U.S.C. 154(b) by 739 days.

(21) Appl. No.: 10/612,876

(22) Filed: Jul. 7, 2003

(65) Prior Publication Data

US 2008/0170018 A1 Jul. 17, 2008

(30) Foreign Application Priority Data

Jul. 4, 2002 (GB) ................................ 0215481.3
Sep. 3, 2002 (GB) ................................ 0220449.3

(51) Int. Cl.
*G09G 3/36* (2006.01)
(52) U.S. Cl. ........................ 345/694; 345/87; 345/690
(58) Field of Classification Search ........... 345/87–102, 345/690–694, 208, 211–214, 695, 696
See application file for complete search history.

(56) References Cited

U.S. PATENT DOCUMENTS

| | | | | |
|---|---|---|---|---|
| 4,712,877 A | | 12/1987 | Okada et al. | |
| 5,748,276 A | * | 5/1998 | Uno et al. | 349/144 |
| 5,805,136 A | * | 9/1998 | Silverbrook et al. | 345/695 |
| 5,905,482 A | * | 5/1999 | Hughes et al. | 345/89 |
| 6,088,011 A | * | 7/2000 | Lee et al. | 345/60 |
| 6,094,187 A | | 7/2000 | Jones et al. | |
| 6,249,332 B1 | | 6/2001 | Bryan-Brown et al. | |
| 6,417,868 B1 | * | 7/2002 | Bock et al. | 345/698 |

FOREIGN PATENT DOCUMENTS

WO WO-02/08825 1/2002

OTHER PUBLICATIONS

N. Itoh et al. (1998) "17" Video-Full-Color FLCD, *Proc. 5th International Displays Workshops*, Kobe, Japan, pp. 205-208.
P. Slikkerveer et al. (2002) "A Fully Flexible, Cholesteric LC Matrix Display," *Proc SID XXXIII*, 5.2, pp. 27-29.

(Continued)

*Primary Examiner*—Duc Q Dinh
(74) *Attorney, Agent, or Firm*—Morrison & Foerster LLP

(57) ABSTRACT

This invention relates to a liquid crystal device with grey scale. The invention uses dither, either spatial or temporal. For spatial dither the invention arranges so that at least one bit of dither is not a multiple of the size of a smaller bit of dither—in other words there is a fractional weighting. The two bits of dither have the same number of addressable transmission levels and the weighting sacrifices some linearity in exchange for reduction of manufacturing tolerances for the smaller bit. For temporal dither the invention relates to fractional weighting of the duration of the sub-frames.

13 Claims, 14 Drawing Sheets

OTHER PUBLICATIONS

T. Tanaka et al. (1995) "A Bistable Twisted Nematic (BTN) LCD Driven by a Passive-Matrix Addressing," *Proceedings of 15th IDRC*, Hamamatsu, Japan, pp. 259-262.

X.Y. Huang et al. (1998) "Late-News Poster: Gray Scale of Bistable Reflective Cholesteric Displays," Proceedings SID XXIX, LP1, pp. 810-813.

Bryan-Brown et al.(1997) "5.3: Grating Aligned Bistable Nematic Device", *SID 97 Digest*: 37-40.

Bryan-Brown et al. (1998) "Optimisation of the Zenithal Bistable Nematic Liquid Crystal Device (ZBD™)"*Asia Display* 98: 1051-1054.

E.L. Wood et al. (2000) "11.2: Zenithal Bistable Device (ZBD™) Suitable For Portable Applications", *SID 00 Digest*:124-127.

* cited by examiner

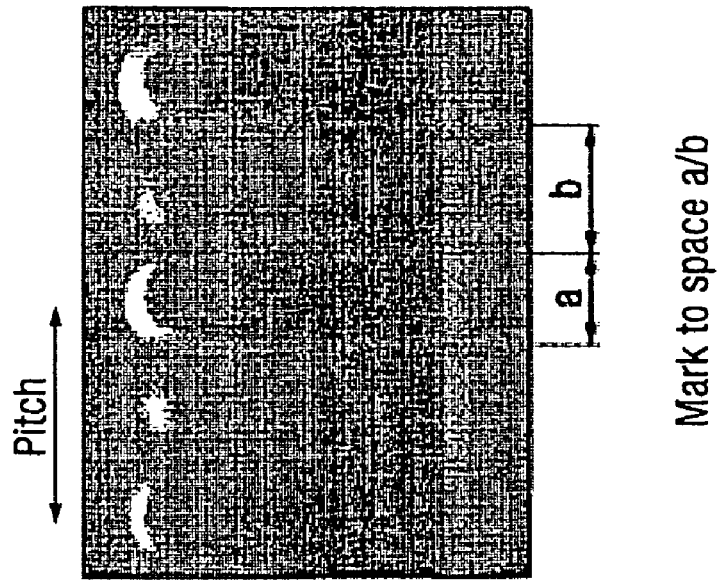
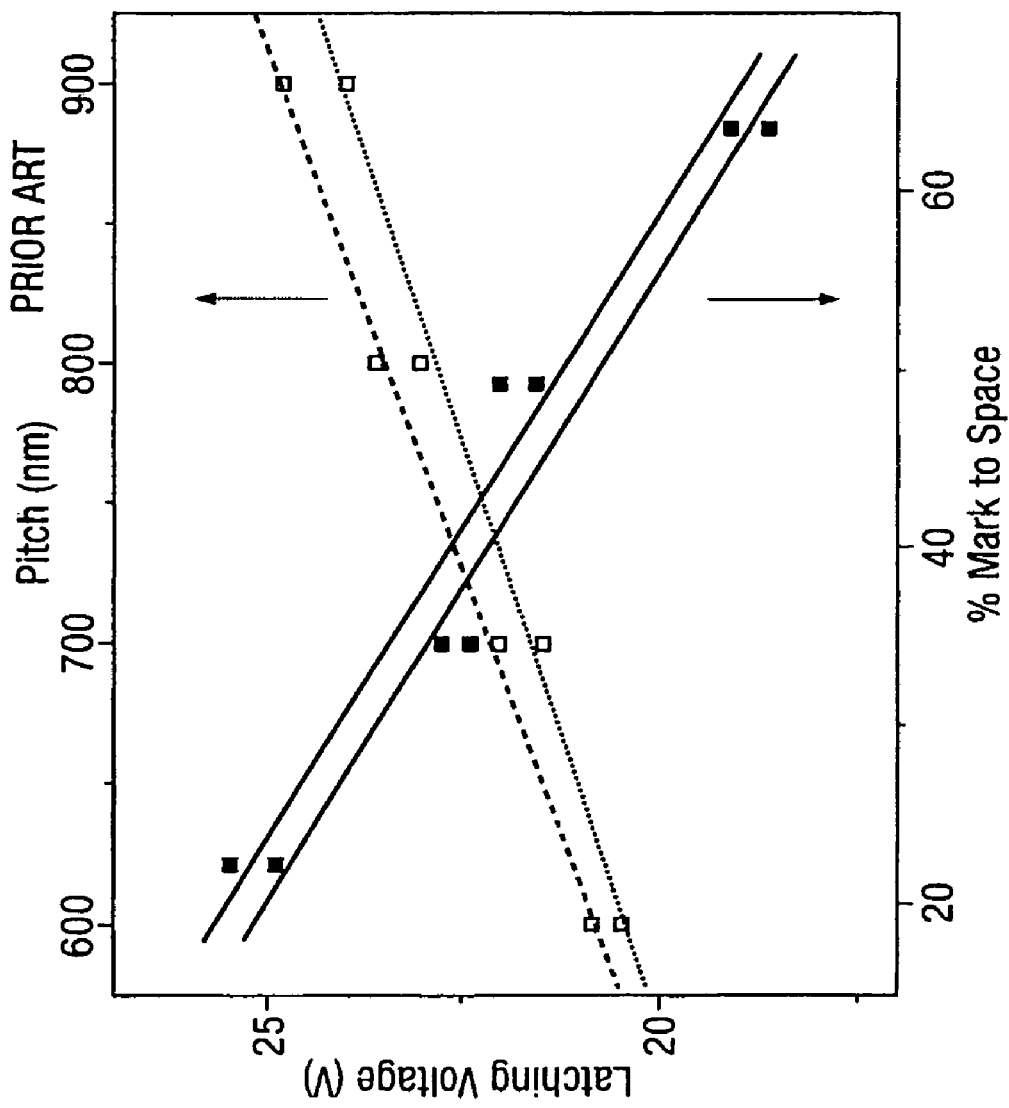
Fig.5.
PRIOR ART

Fig.9
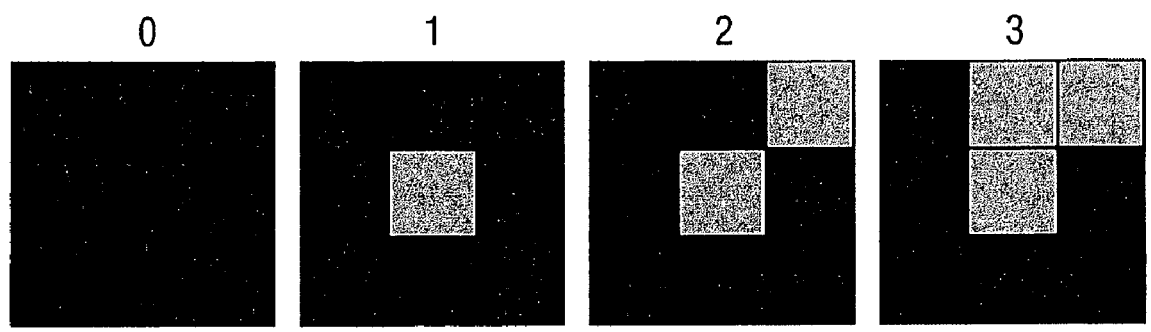
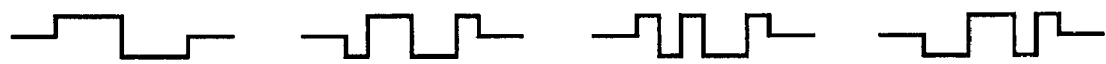
data 1  data 2  data 4  data 13
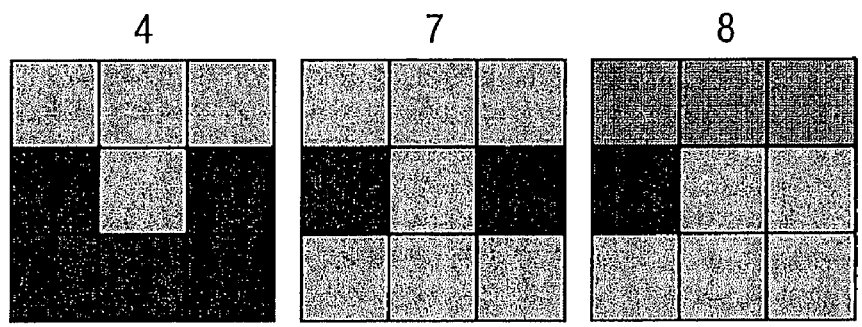
data 17  data 19  data 20

Fig.15.
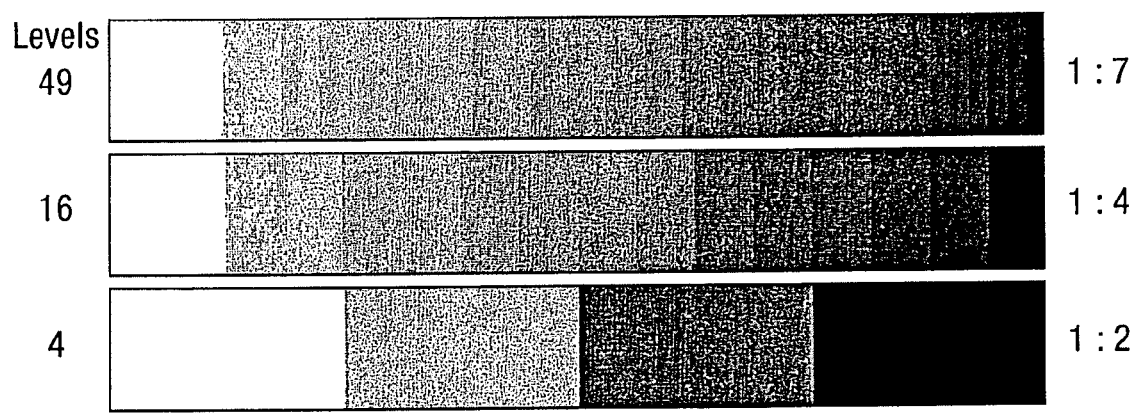
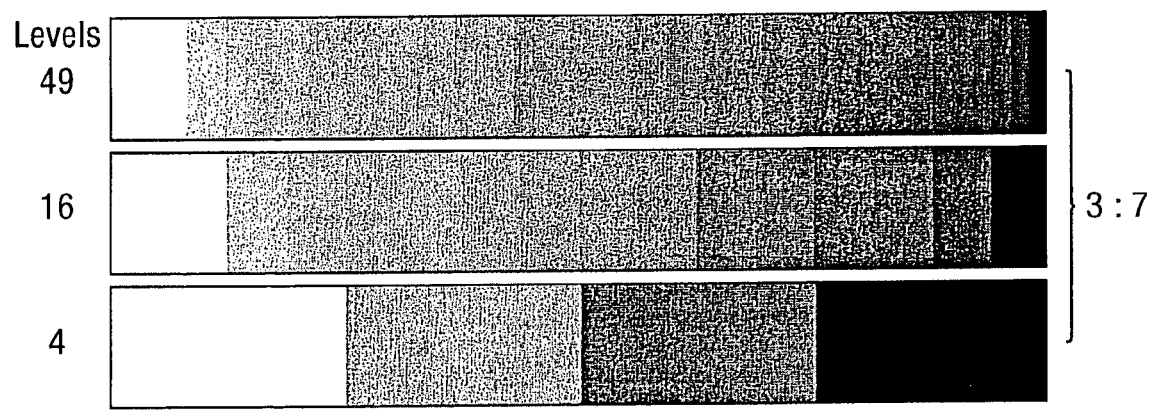

LIQUID CRYSTAL DEVICES WITH GREYSCALE

BACKGROUND OF THE INVENTION

1. Field of the Invention

This invention relates to achieving greyscale in liquid crystal devices, in particular in multi-stable or bistable liquid crystal devices.

2. Description of the Prior Art

Bistable displays are inherently digital in nature, i.e. either the pixel is in one state or the other. However for displaying images it is preferable to have a level of contrast or greyscale for the image. Indeed an essential part of producing colour displays is the achievement of sufficient greyscale. For example, achievement of 4096 colours requires three separately coloured sub-pixels each capable of 16 distinct transmission or reflection levels.

Various mechanisms for achieving greyscale are known. Full colour bistable ferroelectric liquid crystal displays are known (N. Itoh et al. "17" Video-rate Full colour FLCD", *Proc. 5th International Displays Workshops*, Kobe, Japan, pp205-208 (1998). Here 256 greys were achieved using a combination of spatial dither and temporal dither.

Spatial dither uses spatial subdivision to latch varying amounts of the pixel into each bistable state. Temporal dither divides the frame into sub-divisions each of which can be used to display a different image. Temporal dither however requires fast operation and also requires constant update, reducing the usefulness of bistable displays as low power devices. A high level of spatial dither is costly, both in terms of the additional electronic drivers needed, and the reduced etching yield for the least significant (i.e. smallest) electrodes.

Another approach is to generate greyscale through analogue levels. This is done using partial latching of the pixel. After blanking the pixel into one stable state an intermediate voltage level is applied. The applied voltage is insufficient to latch all of the pixel but nucleates domains of the opposite stable state and forms a random mixture of domains. Varying the applied signal can case the number and size of the domains to change leading to a continuos change in the transmission or reflection of the pixel. This approach is often used for bistable cholesteric liquid crystal devices X-Y. Huang et al. "Gray scale of bistable reflective cholesteric displays", *Proc SID XLX, LP.* 1, pp810-813 (1998). However use of analogue levels in this way is dependent on the applied voltage, cell gap and temperature. Numerous variations need to be considered, including local alignment or temperature differences within the panel, transmission line losses associated with long thin electrodes, differences between drivers—either random or due to operating temperature—changes of cell gap associated with the flatness of the glass, or variation of the domain nucleation sites. Any of these variations will cause some change in the transmission or reflection from the pixel. This is shown in FIG. 1 where slight variations across a cell, such as $\Delta V$ lead to relatively large transmission errors $\Delta T$. The total number of greys that can be achieved is related to the acceptable change in transmission caused by the variations, which is in turn related to the gradient of the latching characteristic. Attempts to widen the partial latch width to increase the number of analogue levels that may be achieved often results in an increased number of manufacturing steps.

To prevent overlapping grey levels the display tolerances can become very tight. Considering cell gap variations alone, for a cholesteric device such as described in P. Slikkerveer et al. "A fully flexible cholesteric LC matrix display", *Proc SID XXXIII*, 5.2, pp27-29 (2002) sixteen analogue levels require cholesteric devices to be produced with tolerances of ±1 nm. Bistable Twisted Nematic devices, such as those of Tanaka et al.["A Bistable Twisted nematic (BTN) LCD driven by passive-matrix addressing", *Proceedings of 15th IDRC*, Hamamatsu, Japan, pp 259-262 (1995)] rely on obtaining the correct ratio of cell gap and helical pitch and therefore need tighter tolerances still to achieve reliable analogue greyscale.

U.S. Pat. No. 6, 094, 187 describes a ferroelectric liquid crystal device wherein greyscale is achieved by a combination of dither, either spatial or temporal, with the use of analogue levels. The pixel is divided into a number of bits which may be either spatial or temporal or both. At least two of the bits are addressed with more than two grey levels, i.e. more than just black and white transmission/reflection, and at least one bit is addressed with a lesser number of grey levels. This permits a high number of greys to be achieved.

Again however the analogue levels achieved will be susceptible to temperature variations and a large number of spatial or temporal bits requires additional circuitry and faster addressing.

Zenithal bistable devices (ZBDs) are described in Bryan-Brown et al. "Grating Aligned Bistable Nematic Device", *Proc SID XXVIII*, 5.3, pp 37-40 (1997) and U.S. Pat. No. 6,249,332. These use a surface alignment layer to give two stable states of a nematic liquid crystal material having either high or low surface tilt. The grating may be manufactured using either standard photolithographic methods or by embossing into a conformable layer on one of the inner surfaces of the display. When used opposite a conventional rubbed alignment surface the device may be latched between Hybrid Aligned Nematic (HAN) and Twisted Nematic (TN) configurations. These two configurations are shown in FIG. 2. The device is latched between states using electrical pulses of sufficient impulse, $\tau V$, where $\tau$ is the pulse duration and V its amplitude. In practice a display is addressed a line at a time using bipolar strobe, $V_s$, and data, $V_d$, pulses applied to the row and column electrodes simultaneously. Bipolar pulses are required to prevent unwanted latching effects due to a net DC across the pixel. The line-address-time is then equal to two time slots. Latching occurs on the trailing pulse of the high voltage resultant $|V_s+V_d|$. The leading pulse acts to both DC balance the waveform and to pole the ionic field before the latching pulse. The pixel remains unchanged with the opposite sign of data by ensuring that the low voltage resultant $|V_s+V_d|$ is below the latching threshold.

Black and white ZBD displays are described in E. L. Wood et al. "Zenithal bistable device (ZBD) suitable for portable applications", *Proceedings of SID*, 2000, v31, 11.2, p124-127 (2000) that show good front of screen performance combined with ultra-low power and rugged image storage. A 5 μm cell gap is used with manufacturing tolerances closer to those of conventional twisted nematic (TN) displays rather then Supertwisted nematic (STN) displays. These high tolerances allow complex displays to be fabricated readily using plastic substrates.

Greyscale has previously been achieved in a ZBD device by use of regions having different latching properties. A pixel is sub-divided into various regions, each having a different latching property. The sub-divisions are designed to give separately addressable areas using the using just one set of electrodes and drivers, each giving a discriminating operating window. Within this window the state of the pixel, and hence its transmission level, is insensitive to any variations of the latching threshold that may occur and may be termed 'error-free'. Examples of multiple threshold techniques include varying the cell gap as shown in U.S. Pat. 4,712,877 or the applied field using electrode slits.

Alternatively the shape and alignment properties of the grating may be varied across a pixel, for example to give wide viewing angle and analogue greyscale Bryan-Brown et al. "Optimisation of the Zenithal Bistable Nematic Liquid Crystal Device" *Proceedings of the 18th IDRC*, Seoul, Korea, pp 1051-1053 (1998). For example each sub-pixel can be subdivided into a number of areas with different latching thresholds. The fraction of the pixel that changes state, and hence its transmission, is then related to the applied electric signal. Alternatively International Patent Application WO02/08825 teaches that through appropriate grating design further stable configurations with different surface pre-tilts can be achieved to give a zenithal multistable device. Both of these approaches leads to error-free greyscale as shown in FIG. 3. Within the limits set by the partial latching regions of adjacent thresholds the transmission of error-free greys is independent of variations of the latching threshold.

It is an object of the present invention to provide a light modulating device, especially a bistable liquid crystal device, exhibiting greyscale which mitigates at least of the above mentioned disadvantages and/or allows greater levels of grey scale to be produced.

SUMMARY OF THE INVENTION

Thus according to a first aspect of the present invention there is provided light modulating device having at least one pixel comprising a plurality of separately addressable sub-pixels of different areas wherein the area of a first separately addressable sub-pixel is smaller than the area of a second separately addressable sub-pixel and wherein the area of the second sub-pixel is not substantially a multiple of the area of the first separately addressable sub-pixel.

The first aspect of the present invention therefore has a pixel comprising differently sized addressable sub-pixels, i.e. the pixel has spatial dither—a plurality of regions that can be addressed separately to vary the overall transmission or reflectance of the pixel. However at least one bit of spatial dither, the second addressable sub-pixel, is arranged so that it is not substantially a multiple of the size of another bit, the first addressable sub-pixel. In other words, taking the smallest bit first, the ratio of the areas of two of the bits is 1:X where X is not an integer or substantially an integer. This fractional weighting of the bits sacrifices some linearity but has advantages in removing redundancy as will be described.

Preferably the second separately addressable sub-pixel is the next largest addressable area to the first addressable sub-pixel. Each bit of dither, separately addressable sub-pixel, in the pixel may be arranged so that it is not a multiple of the area of the next smallest bit. In other words the nth bit of spatial dither is not a multiple of the n-1 bit of dither. Preferably, the first addressable sub-pixel is the smallest sub-pixel (least significant bit) and none of the other sub-pixels is a multiple of the area of the first addressable sub-pixel.

Conventional prior art devices are arranged to have integer ratios of the various bit sizes. U.S. Pat. No. 6,094,187 teaches that for m analogue levels the weighting of one dimension of spatial dither would be 1:m:m$^2$ . . . Where a device is used where the whole pixel is bistable with the same latching threshold the number of analogue levels is two. In this case the standard ratio of sizes would be 1:2:4 . . . depending upon the number of bits of dither. If, however, the pixel has more than two analogue levels the ratios change. For instance if the pixel comprises three areas having different latching thresholds then there will be four analogue levels in which case the ratio or weighting of the bits will be 1:4:16 and so on.

This can have constraints on the size of the least significant bit. If pixel size is limited then the size of the least significant bit for this weighting of dither causes manufacturing problems, even with just two sub-pixels of dither. The weighting of the bits can be reduced, i.e. the largest bit can be reduced to a multiple of the area of the smaller bit which is lower than m, but this can lead to redundant grey levels. By using a fractional weighting the redundancy of the grey levels can be removed.

Fractional dither does however lead to a non linear range of greys. Imagine that a pixel comprises two bits each with three equal area latching regions. Each bit therefore has four analogue levels. As would be understood by the skilled person, and described in U.S. Pat. No. 6,094,187 a weighting of 1:4 would then allow 16 linear transmission/reflection levels.

Use of a fractional weighting however will sacrifice some linearity, i.e. the difference in percentage transmission between grey levels would vary depending upon the levels under consideration. However the amount of error may be small and may be unnoticeable to human vision. Part of the present invention lies in the realisation that fractional dither can be used to aid manufacturing steps and improve uniformity, and that the lack of linearity can be acceptable.

Preferably to increase the number of grey levels available the device is arranged so that each sub-pixel can be addressed with more than two analogue levels. As will be understood by one skilled in the art the term analogue level is taken to mean a different transmission or reflection level. With bistable devices where the display medium has two stable display states additional analogue levels can be formed by sub-dividing each sub-pixel into regions having different latching characteristics. In this way all, none or some of the addressable area can be latched to on of the stable states by an appropriate addressing signal.

Consider a bistable liquid crystal device where latching is caused by application of an appropriate voltage pulse. An appropriate pulse applied to a sub-pixel may be above the threshold for some latching regions and would cause latching but would be below the latching threshold for other latching regions. Therefore a number of so called error free grey levels can be achieved. Where there are n latching regions n+1 grey levels can be achieved for each sub-pixel. For example if each sub-pixel or bit had two latching regions three grey levels could be achieved; both regions in one stable configuration (state 0) both regions in the other stable configuration (state 1) or one region in state 0 and the other in state 1.

Having a plurality of latching regions in each bit of spatial dither means that a large number of greys can be displayed. Given that the grey levels are error free levels a device according to the present invention has advantages over that described in U.S. Pat. No. 6,094,187 as the error free greys are less sensitive to display variations. Changes to the display conditions across a panel will not effect the grey levels as much as reliable display properties can be achieved. Given that the error free grey levels correspond to actual latching areas with different properties each bit, or sub-pixel, is arranged to have the same number of different latching regions and hence the same number of greys. In this way problems of aligning the grating areas with the addressable regions are avoided and less complicated fabrication techniques can be used.

Each bit may be divided just into the n separate latching regions, for instance if there are three latching regions then the sub-pixel may just comprise three equally sized areas of different latching characteristic. Alternatively a latching region may comprise more than one distinct area with the same latching characteristic, i.e. each separate latching region may comprise one or more physically separated areas within the sub-pixel and the term latching region should be construed accordingly. In the example above with three latching regions the sub-pixel may for instance by divided into nine equally sized areas with three of these areas having a first latching threshold and comprising a first latching region, three having a second latching threshold and so on. If the different grating latching areas are formed as a repeating pattern on a grating the size and orientation of the addressable sub-pixel will dictate how many repeating units of the pattern are encompassed in the sub-pixel and comprise the latching region.

Preferably the total area of the each of the n latching regions in a sub-pixel is the same. As latching occurs above a threshold a suitable voltage pulse to latch a particular region will inevitably latch all regions having a lower latching threshold. Therefore increasing the latching pulse will cause successively more regions to latch and ensuring that the areas of each region are equal gives the bit good linearity.

It should be remembered of course that the latching threshold for liquid crystal devices is based on a voltage-time product and that reference to an increasing voltage pulse is to increasing the voltage time product. Also the skilled person would appreciate that latching can depend upon the addressing waveforms used and so the thresholds mentioned are not necessary fixed for all waveforms that could be applied. However it will generally be understood that if a pulse is sufficient to latch region A but insufficient to latch region B then another pulse which is sufficient to latch region B would also be capable of latching region A.

Different arrangements for the different latching areas may be used. Conveniently for liquid crystal devices the device includes at least one alignment grating and the grating properties are varied to give the different latching areas. The advantage of altering the grating properties such as pitch, amplitude, mark to space ratio and offset is that the complexity is contained in the production steps such as production of a grating mask for photolithography or a master for embossing.

As mentioned one arrangement could be to have alternating bands of different latching areas. In this arrangement one set of electrodes may be aligned parallel to the bands and the other set of electrodes arranged to be perpendicular. The electrodes having spatial dither are conveniently arranged perpendicular to the bands as then the change in size of the electrodes does not mean more or less of any latching area is included. The electrodes running parallel to the bands preferably of a width which is a multiple of the width of the n latching areas so that each band is included in each bit.

An alternative is to pattern the grating area with an array of differently shaped areas that tessellate. Square or rectangular areas are convenient and again if dimensioned correctly with regard to the electrodes can be used without needing precise alignment as the overall area covered would be the same.

It should be noted however that the bits of spatial dither could be formed from a region addressed by a plurality of active matrix elements or any other suitable means for applying an appropriate pulse and the invention is not limited to row and column matrix addressing.

It should also be noted that analogue grey levels may be achieved in other ways than having regions of different latching thresholds. Additionally or alternatively the device could be multistable with three or more stable states, each stable state having a different transmission/reflection characteristic.

Spatial dither may be combined with temporal dither to achieve a greater number of grey levels and both can be used with analogue levels as described above. Further two dimensions of spatial dither may be used, i.e. both row and column electrodes may exhibit spatial dither.

Manufacturing requirements will limit the number of separate latching regions that can be fabricated for each addressable region. However further greys can be used by making use of error-free and error containing levels.

In other words the device may be arranged to exhibit partial latching, i.e. an addressing pulse may be applied that causes one latching region to be partly in one state and partly in another. In this case the device is designed such that any particular voltage pulse can cause complete latching of zero, one or more regions and partial latching of one region, but no two regions can be partially latched. Therefore both error-free levels are achieved—complete latching of a latching region, together with error containing levels—partially latched regions. The number of grey levels that can be achieved is therefore increased.

Standard operating conditions are the idealised temperature and stress conditions for operating the display. However in reality variations of temperature and mechanical stress across the display will cause variations of the partial latching window. The latching characteristics associated with the error-free levels do not suffer to the same degree however and so offer reliable grey scale even in the absence of error-containing levels. Therefore it is possible, in some circumstances to use error containing levels to increase the level of grey scale. When conditions change, for example temperature variation becomes too much for error containing levels, the error free levels will still allow the device to operate. This permits the advantageous use of several levels when operating conditions are good but still gives reliable levels when conditions are not so good. Thus a useful device is obtained without requiring an undue number of separate grating areas.

The use of fractional dither is especially useful with this aspect of the invention. As the number of analogue levels may vary between just error-free levels and a combination of error-free and error containing levels an integer dither weighting for one situation would likely not be optimised for the other situation. Using a fractional dither weighting results in a useful number of grey levels in both situations with a reasonable approximation to linearity.

In order to reduce manufacturing costs the number of bits of dither is conveniently two, in other words there are only two addressable sub-pixels. In this case, when each sub-pixel exhibits n areas of different threshold (that is n+1 error-free analogue levels) the ratio of the sizes of the first and second addressable sub-pixels may preferably be chosen from the following list; 2:2n+1, n:2n+1 or n+1:2n+1. For instance where there are three regions leading to 4 error free analogue levels the ratio of the sizes, i.e. the weighting of the bits may be chosen to be 2:7, 3:7 or 4:7. In this fashion, $(n+1)^2=16$ greys is achieved without redundancy and with a least significant bit electrode width that is 29%, 43% or 57% of the most significant bit electrode. This contrasts with the prior-art weighting of 1:n+1=4, wherein 16 greys (albeit linear) are achieved with a least significant electrode that is 25% that of the most significant bit.

The concept of fractional dither applies equally well to temporal dither and therefore in another aspect of the invention there is provide a light modulating device having at least one pixel and a driver for addressing the pixel wherein the driver addresses the pixel with at least a first sub-frame and a second sub-frame wherein the second sub-frame has a longer duration than the first sub-frame and the duration of the second sub-frame is not substantially a multiple of the duration of the first sub-frame.

The same considerations apply for temporal dither as apply to spatial dither, it is usual to have one bit, or sub-frame, of temporal dither a multiple of the a smaller bit of temporal dither. The advantages of the present invention in providing a range of non overlapping grey levels which can cope with differing amounts of analogue levels, at the expense of some linearity.

The invention can also relate to the method of addressing a light modulating device having at least one pixel comprising the step of addressing the device with at least two sub-frames, a first sub frame having a shorter duration than a second sub-frame, wherein the duration of the second sub-frame is not substantially a multiple of the first sub-frame.

Fractional dither is therefore useful in any situation where dither is used with a light modulating device which may work with different number of analogue levels in different situations. In another aspect of the invention therefore there is provided a light modulating device comprising a plurality of pixels wherein the device is adapted to be operable in a first condition where each pixel has n transmission/reflection levels and a second condition where each pixel has m transmission/reflection levels, where n and m are not equal, and also comprising means for addressing each pixel with at least two bits of dither and wherein the weighting of the bits of dither is adapted to work with both n or m transmission/reflection levels. In other words the device is arranged to give the best performance at n analogue levels without sacrificing performance at m analogue levels.

The dither may be spatial or temporal and the none of the larger bits is a multiple of the least significant bit.

Preferably any of the above mentioned aspects of the invention can be implemented using a zenithal bistable liquid crystal device of the type described in U.S. Pat. No. 6,249,332. Such a device offers good control over latching characteristics and excellent optical properties.

Where a zenithal bistable device is used as the liquid crystal device the grating may have a pitch in the range 0.4 μm-1.2 μm, more preferably 0.6 μm to 1.0 μm. The mark to space ratio may lie in the range 20-80%. The grating offset may be in the range 0 nm-500 nm.

A device having more than two stable states may be used in the present invention such as a zenithal multistable device such as described in WO02/08825.

Devices according to any of the aspects of the present invention may be implemented using reflective or transmissive devices and any references to a transmissive or reflect device herein should not be taken as limiting.

As mentioned the invention may be advantageously applied to liquid crystal devices but also finds applications to other light modulating devices:- electrophoretic, cholesteric, bistable twisted nematic, ferroelectric liquid crystal, electrochromic, electrodepositive.

BRIEF DESCRIPTION OF THE DRAWINGS

The invention will now be described by way of example only with reference to the following drawings of which;

FIG. 5 shows the effect of pitch and mark to space ratio on the ZBD latching voltage, FIG. 9 shows photomicrographs of a pixel divided into eight latching areas together with the data waveforms used, FIG. 15 is an illustration of the grey levels achievable for different analogue levels with 'standard' weightings as oppose to a weighting of 3:7.

DETAILED DESCRIPTION OF THE PREFERRED EMBODIMENTS

Figure 1:
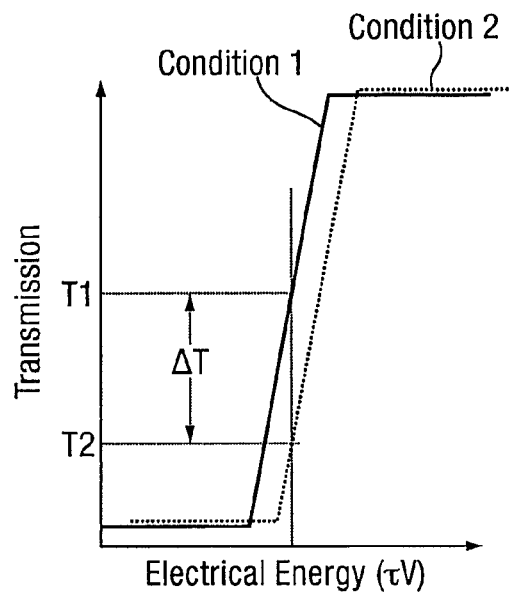
FIG. 1 shows a typical latching response of a domain nucleated bistable device of the prior art.
Figure 2A:
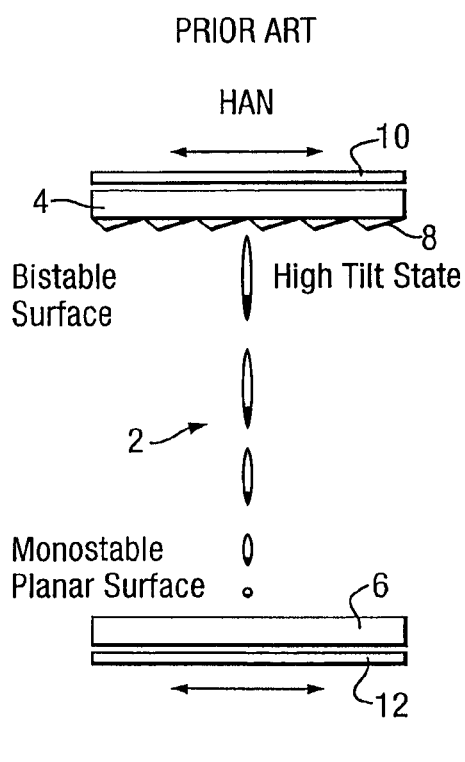
FIG. 2 shows a schematic of a zenithal bistable device (ZDB) having a hybrid aligned nematic (HAN) configuration and a twisted nematic (TN) configuration.
Figure 2B:
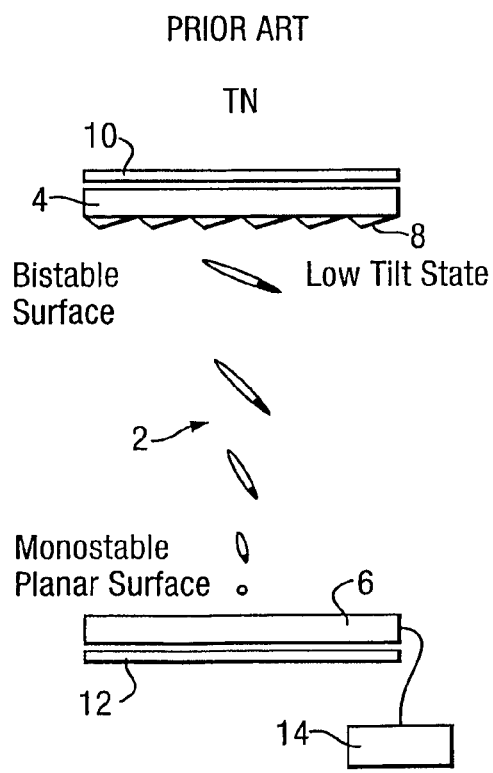

Referring now to FIG. 2 a zenithal bistable nematic liquid crystal device (ZBD) as described in U.S. Pat. No. 6,249,332 is shown schematically. The device comprises a liquid crystal material 2 located between two cell walls 4, 6. The inner surface of lower wall 6 is provided with a monostable planar surface alignment treatment. As shown the liquid crystal director next to this surface lies along an axis that is perpendicular to the page. On the inner surface of the other cell wall 4 is located a zenithal bistable surface alignment treatment 8. This surface treatment causes the liquid crystal material at the surface to adopt either a high tilt state, resulting in a HAN configuration, as shown in FIG. 2a or a low tilt state, resulting in a TN configuration, as shown in FIG. 2b. The device also includes a transmissive polariser 10 and a reflective polariser 12. Other arrangements are possible however, for instance the surface treatment on cell wall 6 could be a homeotropic alignment in some configurations. Also the device could be used as a transmissive device. Other possible configurations would be apparent to one skilled in the art. Addressing means 14 addresses separately addressable areas of the device to switch the liquid crystal material between the two states.

As described in U.S. Pat. No. 6,249,332 or WO02/08825 it is possible through careful grating design to produce gratings that lead to bistability as shown and have different latching characteristics. Therefore each pixel can be sub-divided into a number of areas with different latching thresholds. The fraction of the pixel that changes states and hence its transmission, is then related to the applied electric signal. It should be noted herein that the term grating as used herein is taken to include a periodic surface profile but is not intended to be so limited and any surface treatment or cell design feature leading to bistability in a liquid crystal cell should be taken as included within the meaning of the term. For instance if a ferroelectric liquid crystal device were to be used then the term grating could cover an alignment treatment on one or both surfaces taken together with features of the cell gap.

Figure 3:
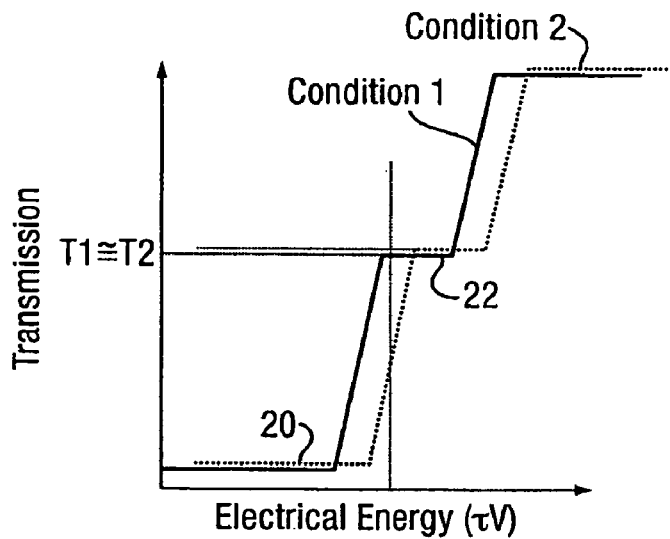
FIG. 3 shows the graph of transmission against energy supplied for a liquid crystal device having two latching areas.

FIG. 3 shows a curve of transmission against the voltage-time product of applied pulses for a ZBD device having two latching regions with different latching thresholds, both initially in a non-transmissive state. Below a certain threshold 20 the voltage pulse supplied is insufficient to latch either region and the overall transmission is low. As the voltage time product is increased however the transmission increases. When the threshold of one latching region is reached the whole of that region is latched. A window 22 is then reached where increasing the energy supplied has no effect as all of one region has latched and the pulse is insufficient to cause any latching of the other region. This window leads to an error free grey level. At this window it can be seen that variations of the conditions across the display have no effect on the transmission. Further increases in the energy supplied then start to latch the other region until all of that region is latched as well.

Figure 4:
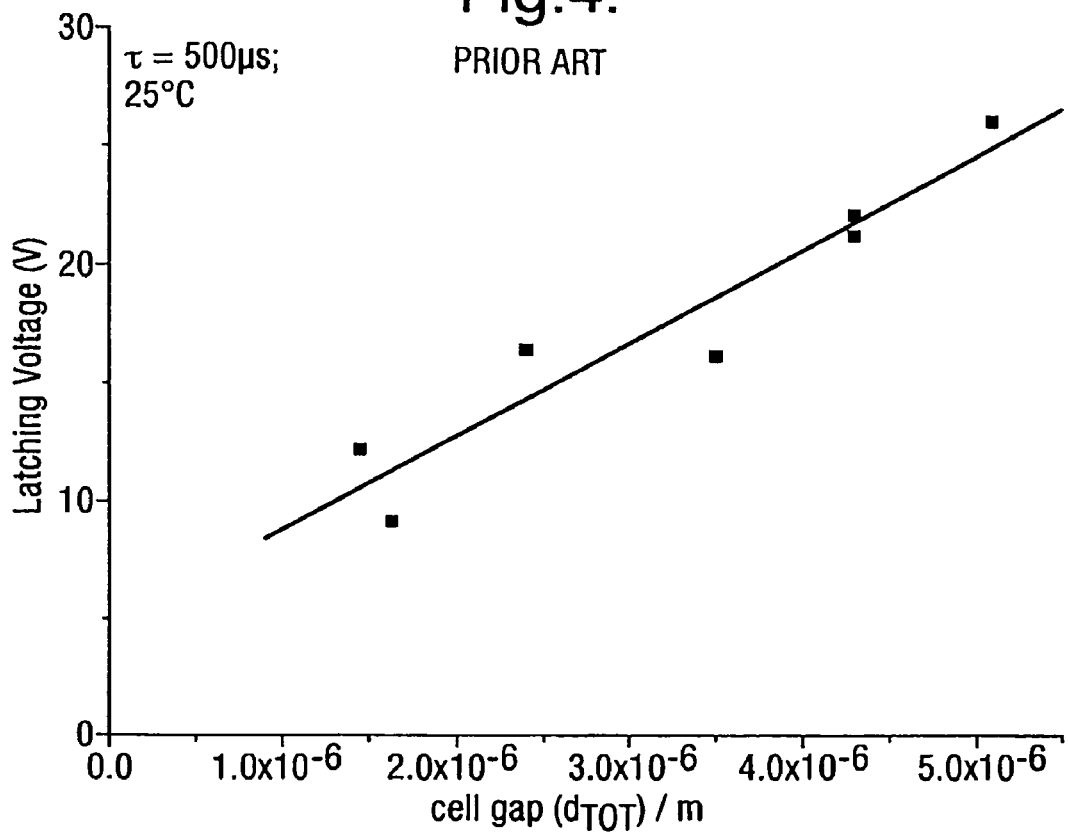
FIG. 4 shows the cell gap dependence of the ZBD latching voltage.

Latching in a zenithal bistable device has a dependence on cell gap. The cell gap dependence demands certain manufacturing tolerances. Latching is a field effect and with standard nematic materials used requires 4V/μm. The effect of cell gap on latching voltage for a test cell was investigated and the results are shown in FIG. 4.

The voltage needed to latch using a 500 μs bipolar pulse at 25° was plotted against cell gap.

Conventional twisted nematic (TN) devices require a cell gap tolerance of ±0.21 μm (to prevent optical variations) whereas STN devices require a lower tolerance, typically less than ±0.5 μm. It can be seen that such cell gap variations across a ZBD panel would change the latching threshold by ±0.8V and ±0.2 V respectively.

There are several practical options for varying the latching threshold of the grating for a ZBD device, including changes of pitch, amplitude, mark to space ratio and offset (i.e. the minimum thickness of the grating layer). Test cells were fabricated using sub-pixels with pitches in the range 0.6 μm to 1.0 μm, and mark to space ratios from 22% to 64% whilst keeping amplitude and offset fixed. As will be understood by one skilled in the art a grating pitch is the distance from one point on a repeating feature to the same point on the next feature. The mark to space ratio is the ratio of the feature width to the gap width.

FIG. 5 shows the latching threshold characteristics of these cells. It can be seen that excellent bistability was maintained across the range of grating shapes, the latching energy reducing approximately linearly with decreasing pitch and increasing with decreasing mark to space ratio. The latching threshold changed by 6V across the window of bistability. In FIG. 5 the lower line for each curve represents the onset of domain nucleation and the upper line complete latching. The partial latching width is therefore typically 0.4V. This means that 6 error-free analogue levels may be achieved in a ZBD panel made to TN tolerances with 15 error-free levels being possible if STN tolerances are maintained. Other changes, such as a change in offset will have an effect and allow further error-free greys to be produced.

Conveniently a grating is used with a pitch in the range 0.41 μ-1.2 μm, more preferably 0.61 μm to 1.0 μm. The mark to space ratio may lie in the range 20-80%. The grating offset may be in the range 0 nm-500 nm. The amplitude of the grating may be in the range 0.6 μm to 1.41 μm, preferably being about 0.91 μm to 1.1 μm for a 1.0 μm pitch and a trapezoid grating shape.

Figure 6:
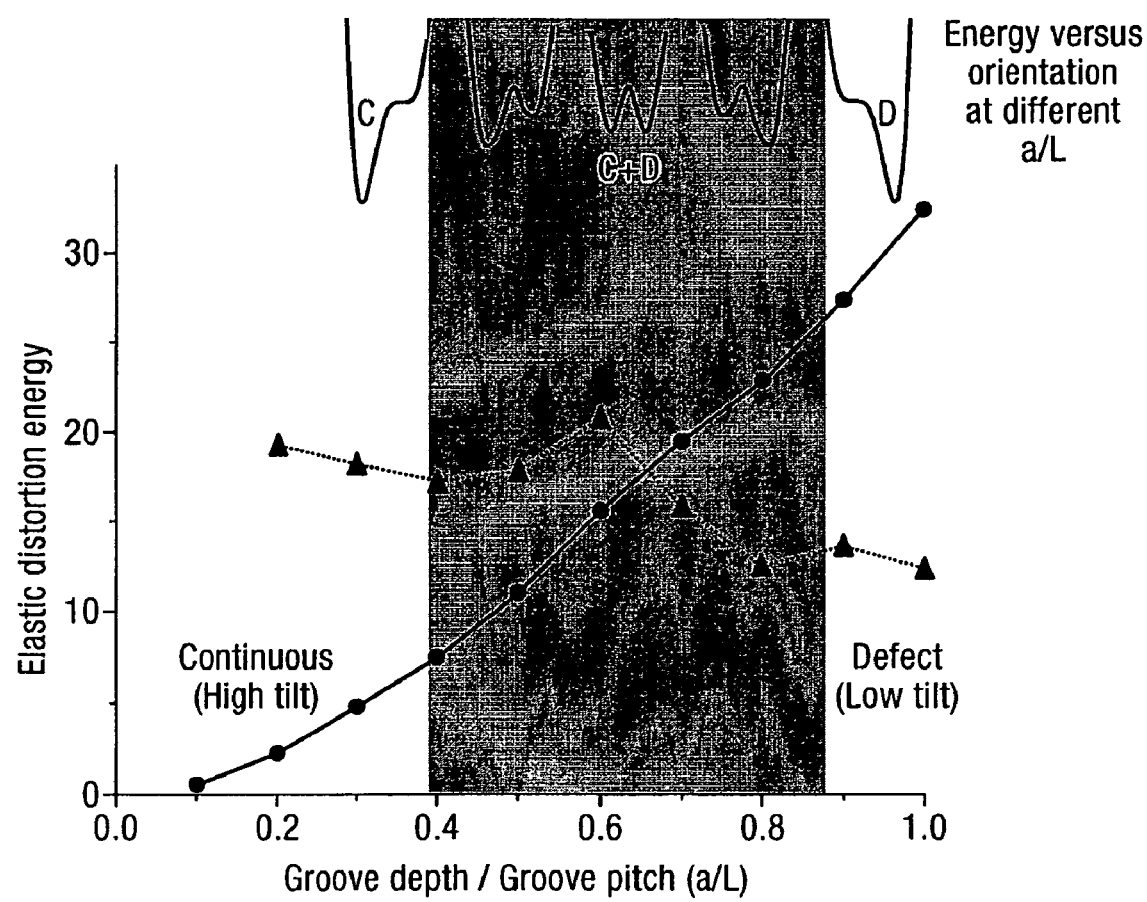
FIG. 6 shows an example of the effect of grating shape on latching threshold.

The principle of cell design is well understood and described in U.S. Pat. No. 6,249,332 or WO02/08825. For example FIG. 6 shows the effect of varying the groove depth to groove pitch ratio for a particular grating design on the elastic distortion energy of the continuous and defect states. The actual energy to latch from one state to the other can be controlled by varying the shape of the surface alignment grating structure. Assuming the high tilt state is dark then the electrical energy required to latch the cell in this state is lower than for latching into the low tilt, defect state for shallow, rounded gratings. Alternatively the low tilt requires low latching energy for deeper, sharper gratings. In the shaded region the device is bistable for this particular shape. Changing the liquid crystal material, altering the temperature of the grating surface properties all effect the anchoring energies and latching characteristic. Therefore suitable design can yield wider ranges.

The cells may have a matrix of electrodes formed on both cell walls, the intersection between row and column electrodes, say, forming an addressable array of elements. Other means of applying a voltage to the liquid crystal material could be used however. For instance the liquid crystal could have an active matrix backplane of thin film transistors or the like. Any means of applying a discriminating voltage pulse to the liquid crystal material may be used.

When overlapping electrodes are used in multiplex addressing it is preferable to use existing commercial drivers, such as STN drivers, to address the bistable displays although this does constrain the addressing schemes used. For example, these drivers are usually restricted to five voltage levels $0$, $\pm V_s$ and $\pm V_d$ where $V_s$ is the strobe voltage level and $V_d$ is the data voltage level where the data voltage is less than or equal to 7V and can not include periods of 0V. This means that amplitude modulated data waveforms are unsuitable for selecting the required grey level with such drivers.

Therefore drive schemes with a four or six time slot line address time have been proposed. As will be understood by one skilled in the art multiplex addressing usually involves a strobe pulse being applied to a row electrode whilst an appropriate data waveform is applied to all the column electrodes simultaneously. The line address time is the time take to address one line of the device, i.e. one set of pixels (or sub-pixels).

One addressing scheme applies a suitable blanking pulse to latch the whole line into one of the states. Then a symmetric bipolar strobe waveform is applied to the particular row electrode synchronously with appropriate data waveforms on the columns. All other rows are held at 0V. The applied strobe was either $(++/--)V_s$ for the four slot scheme of $(+++/---)V_s$ for the six slot scheme. As used herein the notation $(+)V_s$ will be used to represent a voltage level of $+V_s$ for one time slot so $(++/--)V_s$ represents a voltage level of $+V_s$ for two time slots followed by a voltage level of $-V_s$ for two time slots.

For the four slot scheme there are 6 permutations of data waveform $(++/--)V_d$, $(+-/-+)V_d$, $(+-/+-)V_d$, $(-+/+-)V_d$, $(-+/-+)V_d$, $(--/++)V_d$, With the six slot scheme there are 20 possible data waveforms as shown below in table 1.

TABLE 1

| Number | Date Waveform (.../...)$V_d$ | Maximum voltage swing (V) | Trailing pulse energy factor |
|---|---|---|---|
| 1 | +++/--- | $2(V_s - V_d)$ | -3 |
| 2 | -++/--+ | $2(V_s - V_d)$ | -1 |
| 3 | -++/-+- | $2(V_s - V_d)$ | -1 |
| 4 | +-+/--+ | $2(V_s - V_d)$ | -1 |

TABLE 1-continued

| Number | Date Waveform (.../...)$V_d$ | Maximum voltage swing (V) | Trailing pulse energy factor |
|---|---|---|---|
| 5 | +−+/−+− | $2(V_s - V_d)$ | −1 |
| 6 | −−+/−++ | $2(V_s - V_d)$ | +1 |
| 7 | ++−/−−+ | $2 V_s$ | −1 |
| 8 | ++−/−+− | $2 V_s$ | −1 |
| 9 | −+−/−++ | $2 V_s$ | +1 |
| 10 | +−−/−++ | $2 V_s$ | +1 |
| 11 | −++/+−− | $2 V_s$ | −1 |
| 12 | +−+/+−− | $2 V_s$ | −1 |
| 13 | −−+/−+ | $2 V_s$ | +1 |
| 14 | −−+/++− | $2 V_s$ | +1 |
| 15 | ++−/+−− | $2(V_s + V_d)$ | −1 |
| 16 | −+−/−+ | $2(V_s + V_d)$ | +1 |
| 17 | +−−/−+ | $2(V_s + V_d)$ | +1 |
| 18 | −+−/++− | $2(V_s + V_d)$ | +1 |
| 19 | +−−/++− | $2(V_s + V_d)$ | +1 |
| 20 | −−−/+++ | $2(V_s + V_d)$ | +3 |

Figure 7:
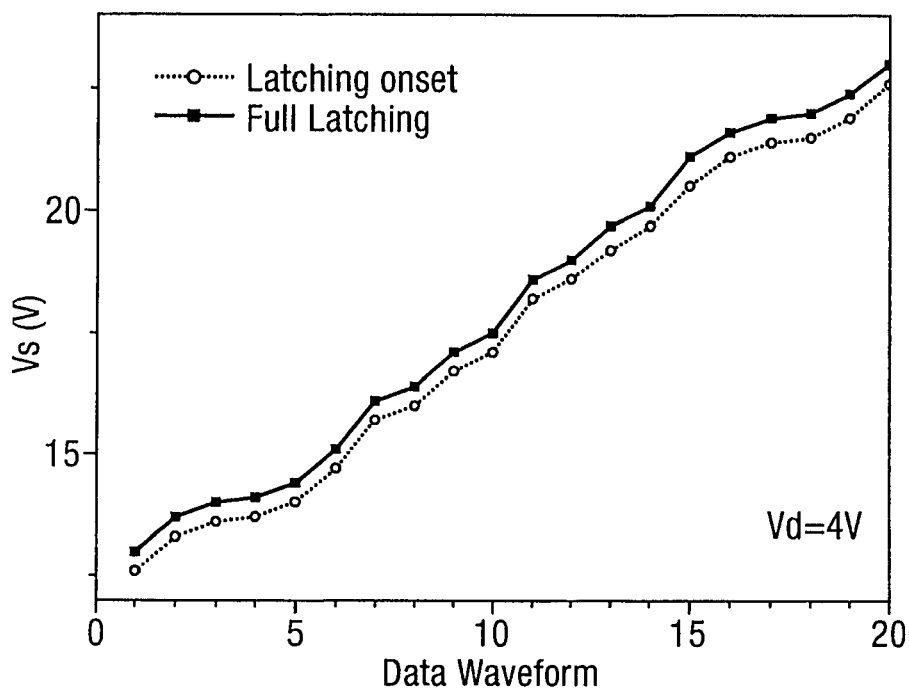
FIG. 7 shows latching voltage as a function of data waveform for the six slot addressing scheme.

To help ensure that each of the required greys is achieved the operating window for each must be as wide as possible. This occurs when the latching threshold (i.e. $V_s+V_d$) is an approximately liner function of applied waveform. FIG. 7 shows typical results of voltage as a function of data waveform for the waveforms shown above in table 1.

Two aspects of the resultant waveform shape effect latching, the select (trailing) pulse energy, which is dictated by the proportion of data signals at $+V_d$ or $-V_d$ in the second part of the signal, and the maximum voltage swing which depends on the data in the third and fourth time slots. The swing has the larger effect on latching voltage but the smaller effect of trailing pulse energy allows fine tuning to ensure that the desired level is obtained over the widest operating conditions.

The ability to switch between numerous analogue levels, including partial switching, using waveforms which vary only in shape and not in absolute amplitude is believed by the inventors to be very beneficial and could be applied to a large range of bistable light modulating devices.

It should be noted therefore that the term threshold as used herein is not an absolute level but the threshold may vary according to the pulse shape used. The important thing is that a pulse can be used that will completely latch one region but cause no latching in another.

Figure 8:
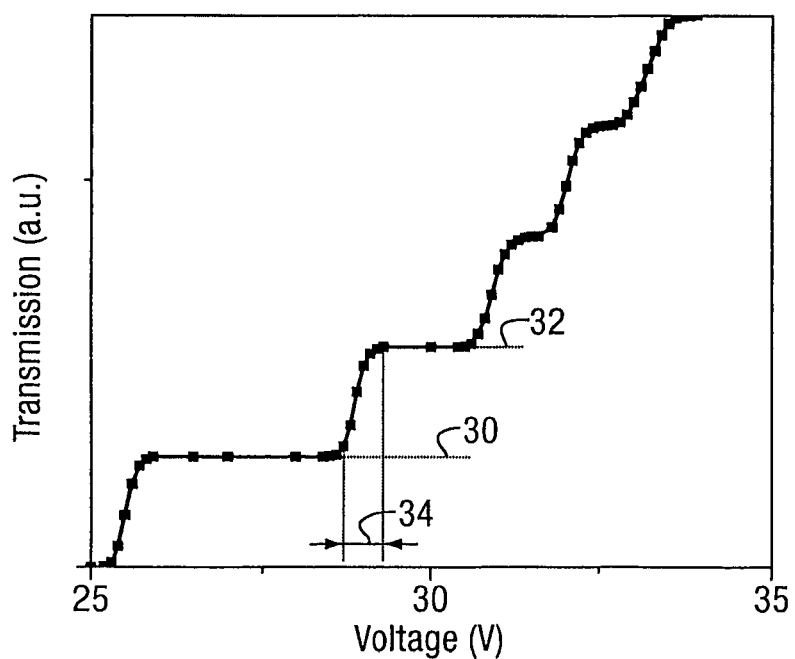
FIG. 8 shows pixel transmission versus addressing pulse amplitude for a multiple latching area pixel ($\tau$=50 μs, T=25° C.)

A pixel was produced having eight areas of different grating shapes of which six were non-degenerate. FIG. 8 illustrates the optical response measured for 5 transitions by changing pulse amplitude (τ=50 μs, T=25° C.). It can be seen that various error free grey levels are achieved. FIG. 9 shows photomicrographs of this cell addressed using the multiplexing waveforms of table 1. This clearly illustrates that at least 6 separately addressable areas may be discriminated using waveforms readily produced using commercially available drivers. The lack of partial latching in each case is indicative of the error-free nature of these transmission levels.

According to one aspect of this invention however the number of greys available is increased by using partial latching of each of the sub-divisions. Referring back to FIG. 8 it can be seen that several error-free grey levels were obtainable and could be addressed by using pulses within the complete latching window. However voltage pulses can also be used that cause partial latching of a particular region.

Imagine that a pixel is divided into three areas having different grating shapes and so different latching thresholds. If the three areas are equal in size four approximately linear grey levels can be achieved. Each area is latchable between two states, a transmissive state and a non-transmissive state. Assume that in the transmissive state the transmissivity of the liquid crystal material is 100% and in the non transmissive state it is 0%. When all the regions are latched into the non-transmissive state the overall transmissivity of the pixel is 0%. However if a voltage pulse is applied which is above the latching threshold for one region, but below the latching threshold for the other two regions then one region will latch to the transmissive state. Thus a third of the pixel will be transmissive and the overall transmission level of the pixel will be approximately 33%. If the voltage was increased however the voltage pulse may exceed the latching threshold of another region. In which case the pulse would be greater than the latching thresholds of two of the regions but lower than the last region. Thus two regions was latch to the transmissive state and the pixel would have an approximately 66% transmission. If a larger voltage pulse still was used the pulse would exceed the threshold of all three regions and the entire pixel would latch to the transmissive state.

However, as can be seen from FIG. 8, between transmission levels 30, 32 there are regions 34 where the transmission varies with voltage. This occurs due to partial latching of the various latching regions. Each latching region created by changes to grating design, offset etc. exhibits a threshold where there is onset of latching but where the voltage level is insufficient to cause complete latching. The result is then partial latching in that area with separate domains of the liquid crystal material being latched into different states.

Therefore the liquid crystal device may be addressed such that one of the grating areas forms a partially latched, or error containing level. Indeed more than one partially latched level with different transmission may be achievable for each grating area depending upon cell design and operating conditions.

Figure 10:
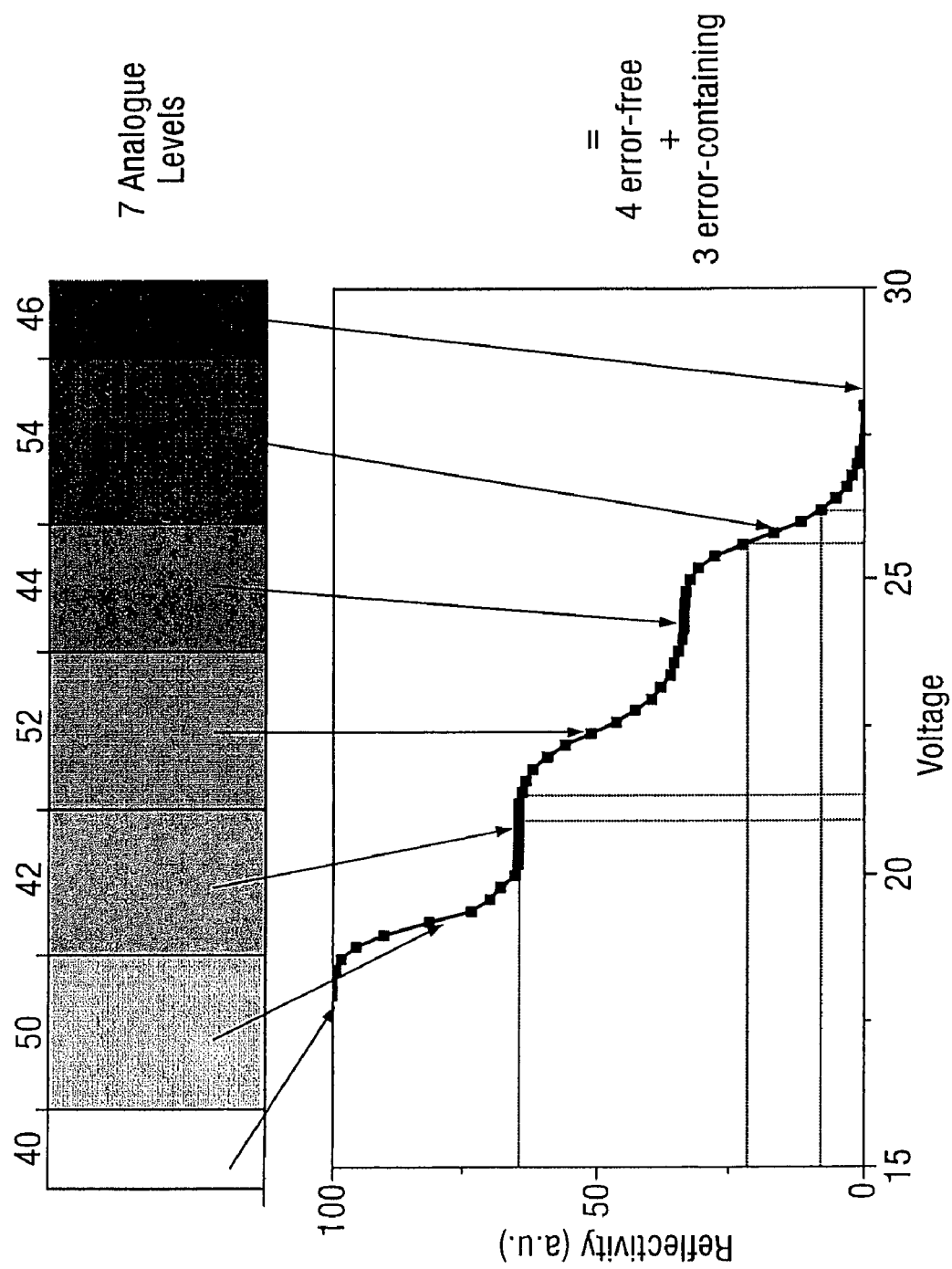
FIG. 10 illustrates the error free and error containing levels on a transmission curve against pulse amplitude.

FIG. 10 shows the principle of error-free and error containing greyscale. The reflectivity of a pixel with three grating areas is shown as a function of voltage. As described this allows four error free levels 40, 42, 44 and 46. Assuming one error-containing grey level is achievable between each error-free level adds another three grey levels, 50, 52, 54.

Figure 11:
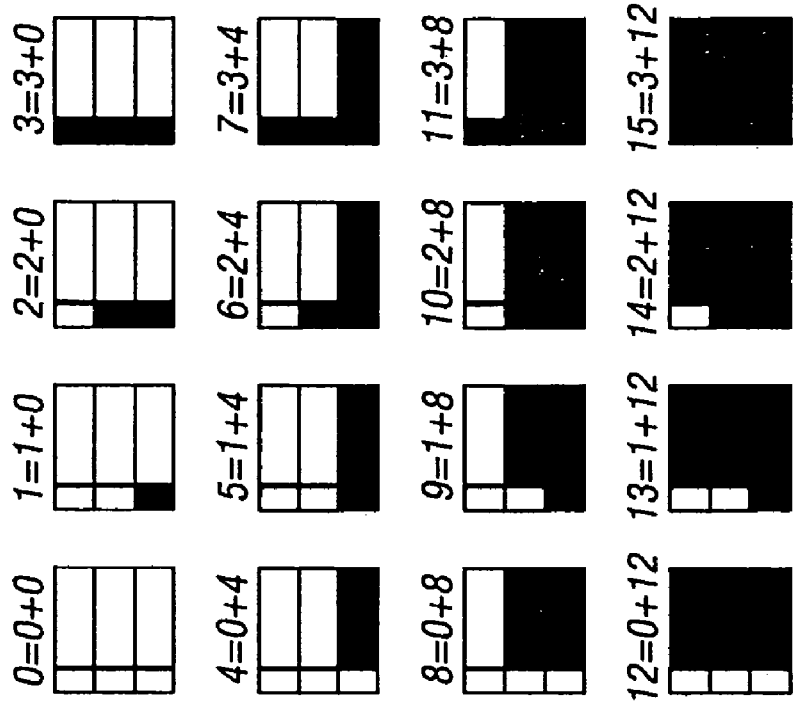
FIG. 11 shows the mechanism for achieving 16 grey levels with 4 analogue levels and a digital dither weighting of 1:4.

The number of grey levels achievable can be increased using dither. Using analogue levels as described sufficiently high levels of grey can be achieved using only two bits of spatial dither. Linearly spaced grey levels without redundancy are possible using an appropriate weighting factor for each of the digital bits. As described in U.S. Pat. No. 6,094, 187 with n analogue levels the sub-pixels should be weighted 1:n:n² ... $n^{(\alpha-1)}$ thereby giving a total of $n^\alpha$ levels. For example, 16 levels are possible with 2 bits of spatial dither (a=2) and four analogue levels by weighting the sub-pixels in areas of 1:4. This is shown in FIG. 11. For a 210 μm square pixel this requires a 38 μm wide least significant (or smallest) bit and three grating areas of 67 μm width, assuming a 10 μm inter-electrode gap.

Although 64 levels are possible from only 8 analogue levels, the narrow width of the least significant bit required may be difficult to fabricate and address. With 8 analogue levels the weighting of the bits should be 1:8. However taking the 210 μm pixel described earlier this requires a least significant bit of 21 μm. Therefore it may be desired to use a lower spatial dither weighting. Using a lower weighting may introduce redundant greys however. For instance were the pixel subdivided into seven equal grating areas (so as to give seven linear error free greys) and two spatial bits with the weighting 1:4 redundant greys are encountered and only 36 separate levels are achieved, i.e. the same transmission level may be obtained in more than one way.

To avoid problems of redundancy greyscale linearity may be sacrificed to some extent by the use of fractional dither weightings, i.e. the larger bits are not multiples of the size of the least significant bit (ratio of 1:x:y where x and y are not integers). Going to a fractional dither ratio can mean that the electrode width of the least significant bit can be increased whilst ensuring the maximum number of greys are achieved by preventing redundant levels.

Fractional dither is therefore useful for spatial and or temporal dither. In temporal dither the duration of the longer sub-frames are not integer multiples of the duration of the shortest sub-frame.

Fractional dither weightings also have another advantage when used with error-free and error containing analogue levels. Consider a display using n separate grating designs within each pixel which gives (n+1 error free greys). Under normal operating conditions it is possible to address an error containing level between each of the error-free operating windows. Thus the total number of analogue levels is equal to 2n+1. At low temperatures, where the device is more sensitive to panel variations it may be no longer possible to achieve the error containing levels and so the number of analogue levels is only n+1. Were spatial dither to be used with the weighting suggested in U.S. Pat. No. 6,094,187 then under normal conditions the suggested weighting would give $(2n+1)^2$ greys are achieved under normal conditions and $n^2$ at low temperatures. Use of a fractional weighting can give optimal performance between the limiting conditions of the high and low numbers of greys. This could be achieved, for two bits, by choosing either of the following weightings;

2:2n+1 n:2n+1 n+1:2n+1

For example where 3 separate grating areas are used per pixel then a digital weighting of 3:7 or 2:7 could be used. This is illustrated in FIG. 12 which shows the transmission levels for the different grey states for a range of weightings of digital dither. In all cases three grating areas were used and the grey levels achievable for different analogue levels plotted.

Figure 12A:
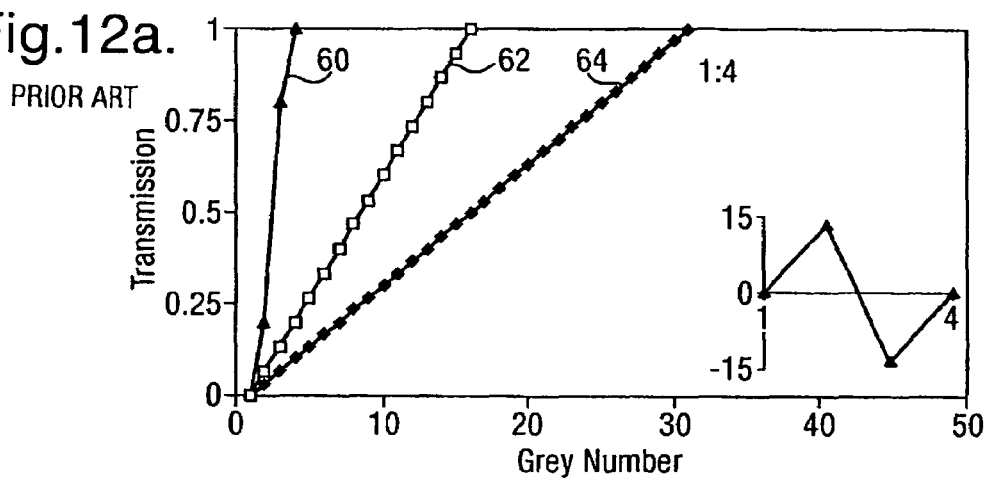
FIG. 12 shows the transmission levels for different grey states with varying amounts of analogue levels for two bits of spatial dither with weightings of a) 1:4, b) 3:7 and c) 2:7.

FIG. 12a shows the weighting 1:4 with the case 60 of 2 analogue levels, 4 analogue levels 62 and 7 analogue levels 64. It can be seen that with 4 analogue levels achievable the weighting 1:4 gives 16 linear grey levels. With 7 analogue levels achievable the greyscale is again linear but only 31 levels are achievable because of redundant levels. Thus in the situation where four error-free and three error containing analogue greys can be achieved only 31 overall grey levels can be reached.

Figure 12B:
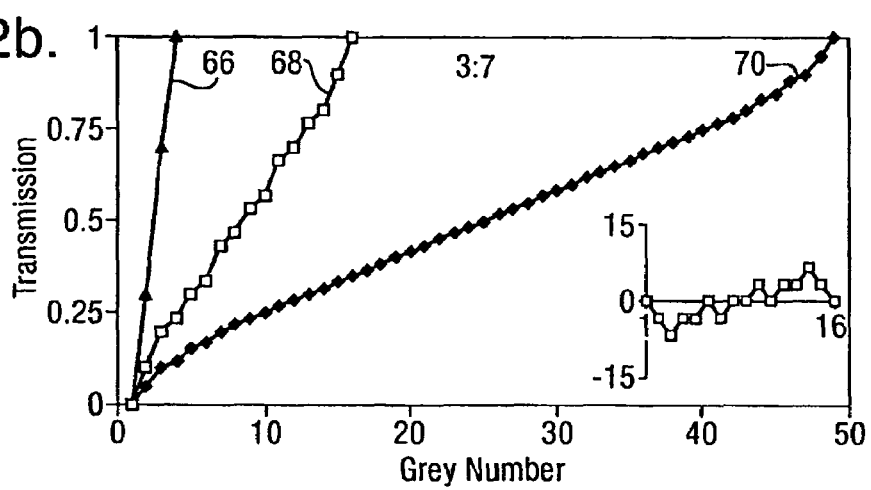
Figure 12C:
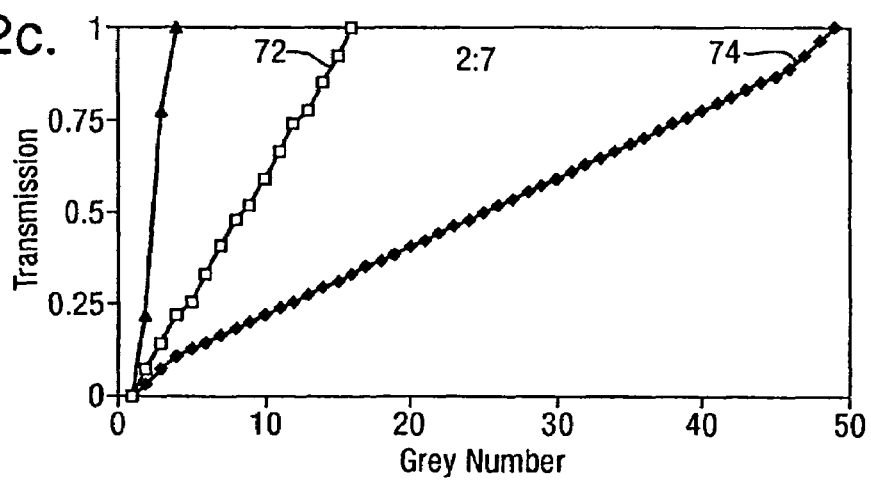

FIG. 12b shows the same analogue levels, i.e. two levels (curve 66), four levels (curve 68) and seven levels (70), but with a fractional dither of 3:7. Here it can be seen that in the worst case situation where only the four error free levels can be achieved the number of greys achievable is 16. The grey levels are approximately linear and are unlikely to be distinguishable by the human eye from those of the 1:4 weighting. Under good conditions however when 7 analogue levels can be achieved it can be seen that 49 nearly linear greys can be achieved with no redundancy. Similarly the four level case 72 with a weighting of 2:7 gives 16 nearly linear greys and seven levels gives 49 greys again.

Figure 13:
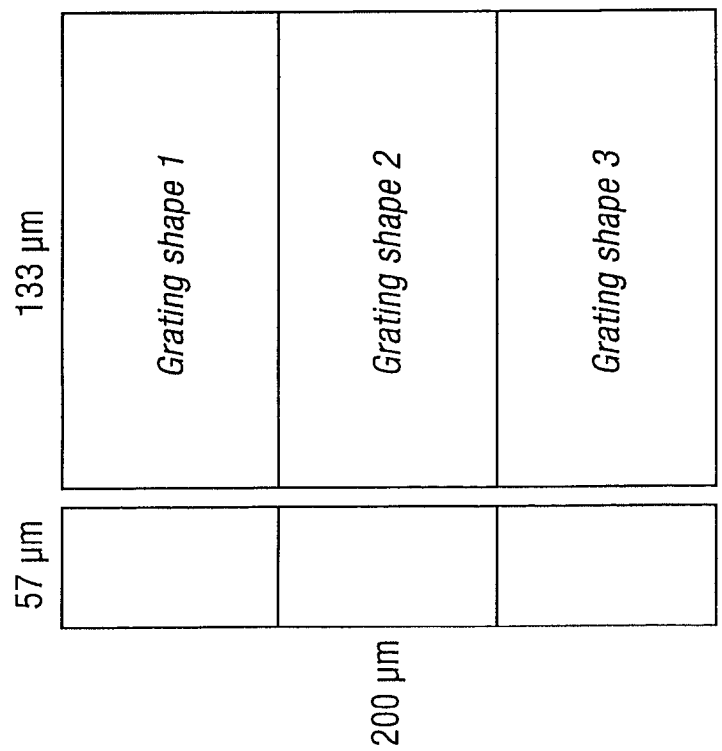
FIG. 13 shows the mechanism for achieving 16 grey levels with 4 analogue levels and a digital dither weighting of 3:7.
Figure 14:
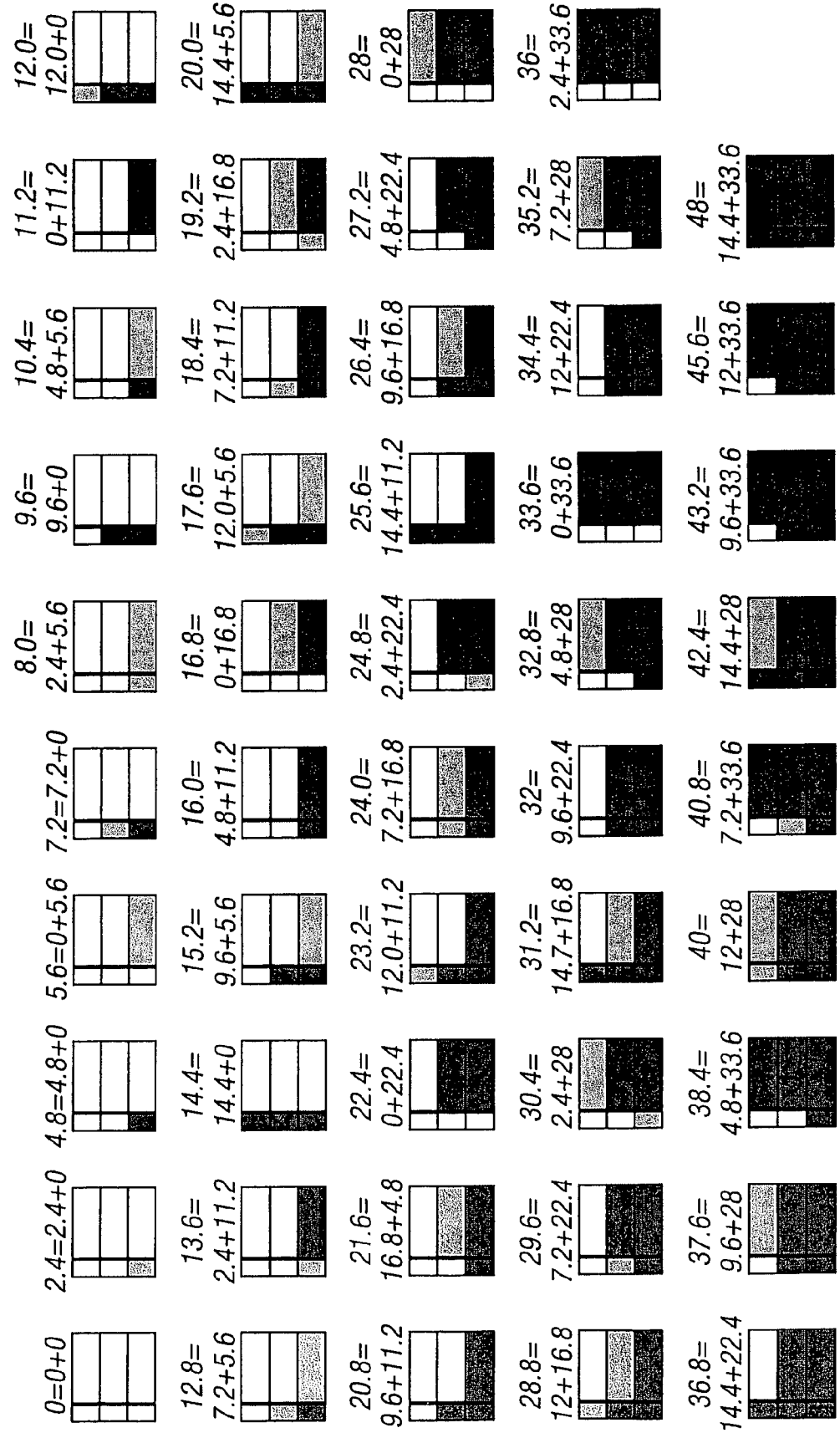
FIG. 14 shows the mechanism for achieving 49 grey levels with 7 analogue levels and a digital dither weighting of 3:7.
Figure 16A:
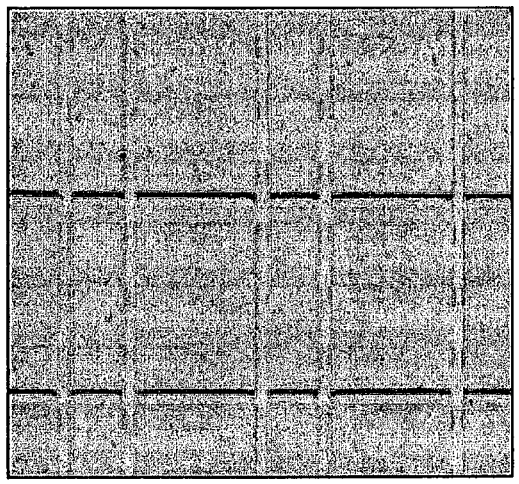
FIG. 16 shows photomicrographs of a ZBD cell having three latching areas in three repeat units at different transmission levels; a) 100%, b) 66.7%, c) 33.3% and d)0%.
Figure 16B:
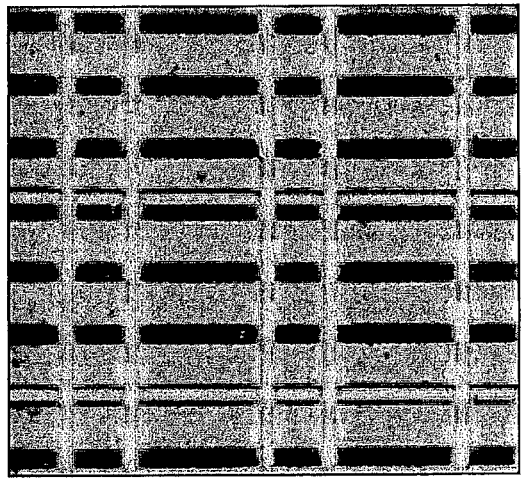
Figure 16D:
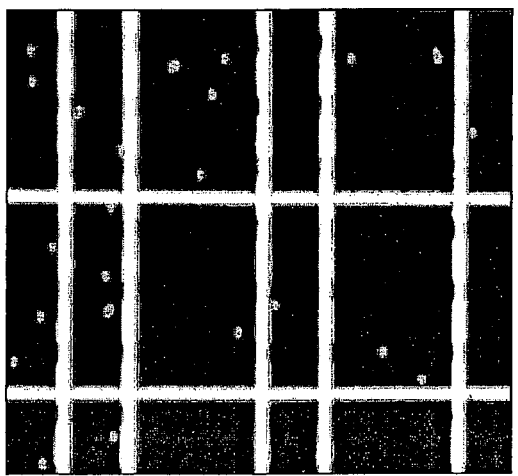
Figure 16C:
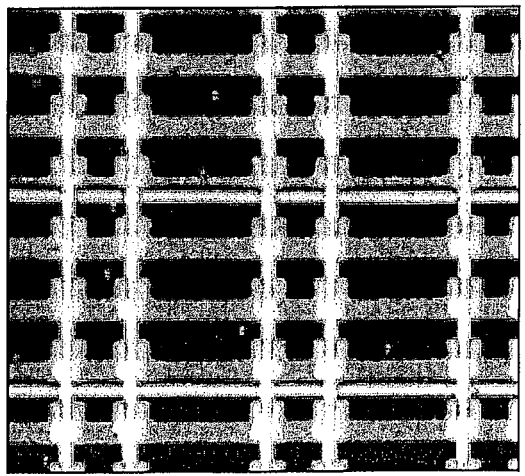

FIG. 13 shows the 16 grey levels achieved from a device weighted in the ratio 3:7 with three grating shapes where only the four error-free levels are used. FIG. 14 then shows the situation where the three error-containing greys are also used.

It will be noted that using fraction dither weighting means that that the different grey levels are built up in a different way to integer weighting. Consider the change from grey level 4.8 to level 5.6. Instead of simply latch the next region in the least significant bit to an error containing level as one might expect with integer weightings the change to the 5.6 level involves leaving all the least significant bit in one state after the blanking pulse and instead latching one region of the most significant bit. The skilled person would be well aware how to create suitable addressing means to calculate or look up the required pattern for a particular grey level.

FIG. 15 illustrates the greyscale achieved using a weighting of 1:X where X is equal to the number of analogue levels for 2, 4 and 7 analogue levels as compared to a weighting of 3:7. It can be seen that any differences between the greys achieved using the fractional weighting and the 'standard' weighting are very slight and that perfectly acceptable displays or modulation devices could be produced using fractional weightings.

FIG. 16 shows a photomicrograph of a ZBD device designed with 3:7 digital dither. Three different grating pitches were used to alter the latching threshold and each of the areas was sub-divided in a pattern of three repeats per pixel to minimise errors associated with the inter pixel gap without requiring a mask alignment step. The device was operated just using the four error-free analogue grey levels. FIG. 16a shows a transmission level of 100% (normalised). FIG. 16b shows transmission of 66.7%, FIG. 16c 33.3% and FIG. 16d 0%. It can clearly be seen that error-free latching areas were achieved and that through use of spatial dither other grey levels could be achieved.

Figure 17:
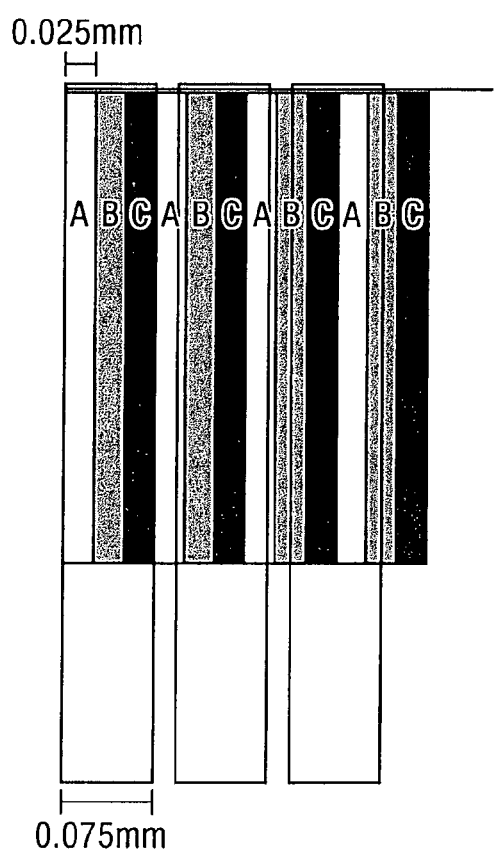
FIG. 17 shows one possible alignment of grating shapes with addressing electrodes.
Figure 18:
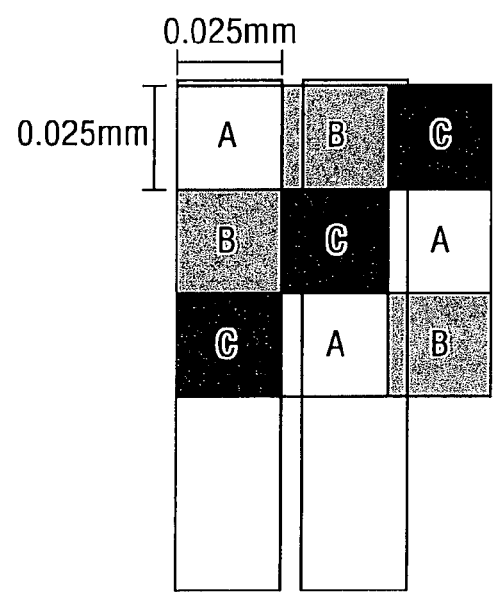
FIG. 18 shows an alternative arrangement of grating areas with addressing electrodes.

In the device shown in FIG. 16 the three grating areas were repeated in bands running perpendicular to the dither electrodes. This means that the other electrode runs parallel to the bands of different grating shape. As can be seen with reference to FIG. 17 the other electrode must be at least as wide as the width of the three tracks otherwise the addressable region would contain different areas of each grating shape. Preferably this electrode is a multiple of the width of the grating bands. If the electrode is a multiple of the width of the grating areas the bands do not need to be accurately aligned with the electrodes as any misalignment on one side will be compensated on the other. An alternative arrangement is shown in FIG. 18 where the dither electrodes are shown. Here the grating areas are tessellated in a manner which means that the grating areas all contribute equally to the addressable regions.

The invention claimed is:

1. A light modulating device having at least one pixel comprising a plurality of separately addressable sub-pixels of different areas wherein the area of a first separately addressable sub-pixel is smaller than the area of a second separately addressable sub-pixel, wherein the area of the second sub-pixel is not substantially a multiple of the area of the first separately addressable sub-pixel and wherein the first and second sub-pixels each have an equal number of selectable transmission/reflection levels, said number of selectable transmission/reflection levels being more than two, the device configured to, in use, selectively address each sub-pixel separately so as to select for that sub-pixel any one of said more than two transmission/reflection levels independently of the level selected for any other of the sub-pixels.

2. A light modulating device as claimed in claim 1 wherein the the device is configured to address each sub-pixel with any one of a predetermined set of addressing waveforms.

3. A light modulating device as claimed in claim 1 wherein the first and second sub-pixels each comprise n latching regions, each latching region having a different latching threshold.

4. A light modulating device as claimed in claim 1 wherein the first and second sub-pixels are configured to exhibit the same number of partial latching levels.

5. A light modulating device as claimed in claim 1 wherein the second separately addressable sub-pixel has the next largest area to the first addressable sub-pixel.

6. A light modulating device as claimed in claim 5 wherein the area of each separately addressable sub-pixel is not a multiple of the area of the next smallest separately addressable sub-pixel.

7. A light modulating device as claimed in claim 1 wherein the first addressable sub-pixel is the smallest addressable area and none of the other addressable areas is a multiple of the area of the first addressable sub-pixel.

8. A light modulating device as claimed in claim 3 wherein the latching regions are configured such that, in certain operating conditions, partial latching of a latching region can occur.

9. A light modulating device as claimed in claim 8 wherein the ratio of the areas of the first and second addressable sub-pixels is chosen so that there are no redundant grey levels when operating in conditions that allow partial latching and also when operating in conditions that do not allow partial latching.

10. A light modulating device as claimed in claim 1 wherein there are only two addressable sub-pixels.

11. A light modulating device as claimed in claims 10 wherein the ratio of the areas of the first and second addressable is chosen from the following: 2:2n+1, n:2n+1 or n+1:2n+1 where n is an integer corresponding to the number of latching regions.

12. A light modulating device as claimed in claim 1 wherein the device comprises a zenithally bistable liquid crystal device.

13. A light modulating device as claimed in claim 1 wherein the device is a liquid crystal device and wherein each separately addressable sub-pixel is arranged to provide alignment to liquid crystal molecules, the alignment direction being the same for each sub-pixel.

* * * * *